(12) United States Patent
Large

(10) Patent No.: US 10,168,811 B2
(45) Date of Patent: Jan. 1, 2019

(54) REFLECTIVE DISPLAY

(71) Applicant: Microsoft Technology Licensing, LLC, Redmond, WA (US)

(72) Inventor: Timothy A. Large, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/583,131

(22) Filed: May 1, 2017

(65) Prior Publication Data

US 2018/0314370 A1 Nov. 1, 2018

(51) Int. Cl.
| | |
|---|---|
| *G06F 3/041* | (2006.01) |
| *G06F 3/044* | (2006.01) |
| *G02B 5/30* | (2006.01) |
| *G02B 5/02* | (2006.01) |

(52) U.S. Cl.
CPC ............ *G06F 3/0412* (2013.01); *G06F 3/044* (2013.01); *G02B 5/02* (2013.01); *G02B 5/3033* (2013.01); *G02B 5/3058* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 5,771,039 A | 6/1998 | Ditzik | |
| 6,395,863 B2 | 5/2002 | Geaghan | |
| 9,239,490 B2 | 1/2016 | Zhu et al. | |
| 9,368,541 B2* | 6/2016 | Kurokawa | ............ G06F 3/0412 |
| 2004/0165060 A1 | 8/2004 | Mcnelley et al. | |
| 2006/0055838 A1 | 3/2006 | Mi et al. | |
| 2006/0230361 A1* | 10/2006 | Jennings | ............... G06F 3/0481 715/786 |
| 2011/0037729 A1* | 2/2011 | Cho | ...................... G06F 3/0412 345/175 |
| 2015/0062448 A1 | 3/2015 | S. | |
| 2015/0212540 A1* | 7/2015 | Tsujimoto | ........... G02F 1/13338 345/174 |
| 2015/0331537 A1* | 11/2015 | Wu | ...................... G06F 3/0416 345/173 |
| 2016/0132175 A1* | 5/2016 | Tsuei | ..................... G06F 3/0412 345/173 |
| 2018/0107302 A1* | 4/2018 | Takada | ..................... G06F 3/044 |

FOREIGN PATENT DOCUMENTS

| | | |
|---|---|---|
| WO | 2009156804 A1 | 12/2009 |
| WO | 2015001496 A1 | 1/2015 |

* cited by examiner

Primary Examiner — Duane N Taylor, Jr.
(74) Attorney, Agent, or Firm — Holzer Patel Drennan

(57) ABSTRACT

A reflective multi-layer structure forms an external surface of an electronic device and includes a light-emitting display separated from the external surface by a dielectric polarizing film and a diffuser. Light emitted by the light-emitting display is transmitted sequentially through the dielectric polarizing film and the diffuser to present information on the external surface.

21 Claims, 5 Drawing Sheets

REFLECTIVE DISPLAY

BACKGROUND

Consumer demand for smaller and more powerful personal electronics devices drives innovation to adapt existing device components for new and/or multiple purposes. Many laptop computers and accessory keyboards include surface area that does not a serve a functional electronic utility. For example, some devices include surface area near a keyboard or touchpad that is largely unused except as a mechanical support or resting place for a user's wrists.

SUMMARY

Implementations described and claimed herein provide a reflective multi-layer structure that serves as a supplemental or primary display for an electronic device. In one implementation, the reflective multi-layer structure forms an external surface of the electronic device and includes a light-emitting display that is separated from the external surface by a dielectric polarizing film and a diffuser. Light emitted by the light-emitting display is transmitted sequentially through the dielectric polarizing film and the diffuser to present information on the external surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed technology provides an electronic device with a reflective multi-layer display structure with a metallic appearance. The reflective multi-layer display structure includes a light-emitting display offset from an external surface of the electronic device by a dielectric polarizing film and a diffuser. Light emitted by the light-emitting display is sequentially transmitted through the dielectric polarizing film and the diffuser before passing through the external surface of the electronic device. In one implementation, the reflective multi-layer structure appears 'metallic' at the external surface, such as to create an illusion of uniformity in color and tone between the display and other external components of the electronic device. By illuminating pixels of the light-emitting display, the computing device can, in effect, display information in the form of illuminated markings on an opaque (e.g., metallic-toned) backdrop.

Some implementations of the disclosed technology further integrate touch sensing technology to facilitate use of the reflective external surface as an interactive writing surface. For example, a user may draw on the reflective external surface with a finger or stylus and the underlying display may selectively illuminate pixels at corresponding locations of the light-emitting display.

Figure 1:
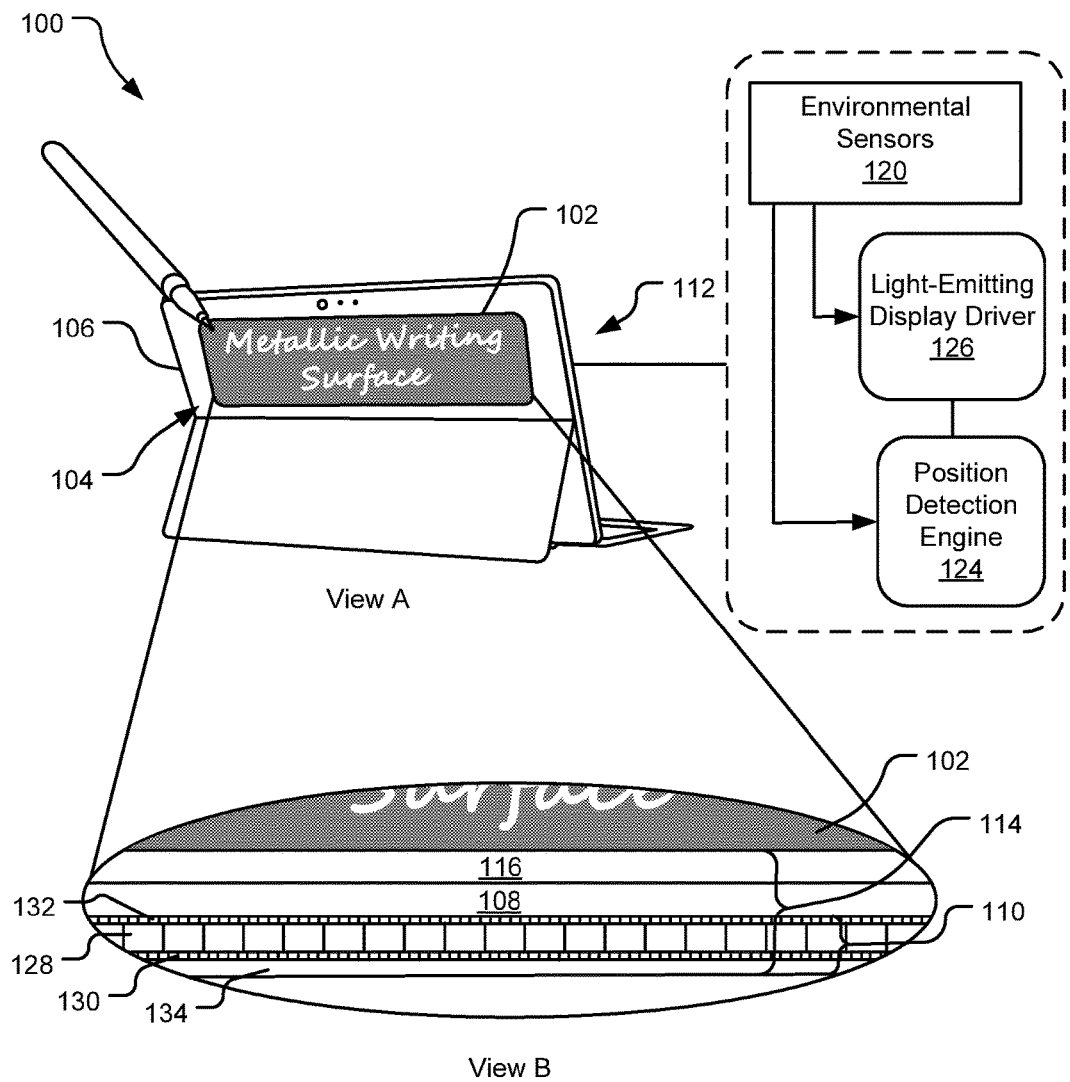
FIG. 1 illustrates an example system with a reflective display for presenting information on an external surface of a computing device.

FIG. 1 illustrates an example system 100 with a reflective display 102 for presenting information (e.g., illuminated text "Metallic Writing Surface") on an external surface 104 of a computing device 106. The reflective display 102 appears opaque and/or "metallic" in outward appearance but also facilitates transmission of select polarization(s) of light projected by an underlying light-emitting display 110 (as shown in View B and discussed in greater detail below).

As shown in View A, the computing device 106 of FIG. 1 is a laptop and the reflective display 102 is a supplemental display included on the back side of the laptop that is separate from a primary display (e.g., a computer screen 112). Although the reflective display 102 is visible when the laptop is in the open position (as shown), the user may, in some implementations, elect to fold the laptop into a closed position with the reflective display 102 facing up to more directly view and/or interact with information presented on the reflective display 102.

In various implementations, the computing device 106 and reflective display 102 may take on a variety of forms different from the laptop shown in FIG. 1. In some implementations, the computing device 106 may not include a primary display that is different from the reflective display 102. For example, the computing device 106 may be a computing accessory (e.g., a writing tablet designed to operate under control of a host computer) and/or the computing device 106 may include its own processing circuitry yet lack a primary display that is separate from the reflective display 102. For example, the computing device 106 may be integrated into a household appliance, such as a smart refrigerator or desk with an external surface including the reflective display 102.

The reflective display 102 includes a multi-layer structure 114 shown in detail in View B. The multi-layer structure 114 includes a light-emitting display 110 embedded below a diffuser layer 116 and a dielectric polarizing film layer 108. In some implementations, the multi-layer structure 114 may include one or other additional light-transmissive layers above the light-emitting display 110 in addition to the diffuser layer 116 and the dielectric polarizing film layer 108. For example, the multi-layer structure 114 may include a protective glass screen (not shown) overlying the diffuser layer 116.

When isolated from the diffuser layer 116, the dielectric polarizing film layer 108 is highly reflective (e.g., exhibits a reflectivity that is greater than 50%), and may have a mirror-like appearance. Incident light from an environmental external to the computing device 106 is, when transmitted down through the diffuser layer 116, spread out or scattered by the diffuser layer 116 and reflected off the dielectric polarizing film layer 108. Material choice and properties of diffuser layer 116 are selected such that, when viewed from above (e.g., a position external to the computing device 106), the multi-layer structure 114 has an opaque and/or metallic appearance that prevents a user from seeing through the multi-layer structure 114 to the light-emitting display 110.

In different implementations, the diffuser layer 116 may include different types of optical diffusing materials having different properties selected to tune color and tone of the reflective display 102 in accord with specific design criteria. In at least one implementation, the diffuser layer 116 is selected to ensure that the reflective display 102 appears uniform in color and/or tone as compared to adjacent external device components, such as metallic components.

The light-emitting display 110 is shown to include a display panel 128 positioned between polarizers 130 and 132 and above a backpanel 134 that provides light for the display panel 128. For example, the light-emitting display may be an LED, or other backlit display and the backpanel may include one or more fluorescent tubes, electroluminescent devices, gaseous discharge lamps, LEDs, plasma panels, or any combination thereof. In another implementation, the electronic device does not include a backpanel. For example, the light-emitting display 110 may be an organic light emitting diode display (OLED) including an emissive electroluminescent layer that emits its own light in response to electrical current.

Due to inclusion of the polarizers 130 and 132, light output by the light-emitting display 110 is of a select polarization. The dielectric polarizing film layer 108 has a polarization direction that is, in one implementation, aligned with the output polarization direction of the light-emitting display 110 so as to maximize transmission of light between the light-emitting display 110 and the diffuser layer 116, resulting in zero or near-zero optical loss.

Although the disclosed technology may, in some implementations, be utilized within non-interactive display systems (e.g., exclusively for presentation of information), the reflective display 102 is, in FIG. 1, shown to be an interactive writing surface. As such, the computing device 106 includes one or more environmental sensors 120 for sensing proximity and/or positioning of object(s) relative to the reflective display 102. For example, the environmental sensors 120 may collect inputs that facilitate stylus-based detection and/or finger-based detection. Additionally, the environmental sensors 120 may collect inputs that facilitates a selection of one or more illumination parameters (e.g., brightness, color) for the light-emitting display 110.

Inputs collected by the environmental sensors 120 are provided to a position detection engine 124 that processes and analyzes the inputs to identify pixel locations on the light-emitting display 110 corresponding to locations where an object (e.g., stylus or finger) is detected relative to the reflective display 102. The position detection engine 124 provides the identified pixel locations to a light-emitting display driver 126 that selectively illuminates pixels at the identified pixel locations responsive to receipt of such information. In effect, a user may move an object (e.g., a stylus or finger) across the reflective display 102 and the light-emitting display driver 126 may, in response, present illuminated markings on the reflective display 102 that mirror the movements of the object. In some implementations, the system 100 may further includes a recordation application (not shown) that stores information presented on the reflective display 102 in memory of the computing device 106 or within another computing device communicatively coupled to the computing device 106.

In various implementations, the environmental sensors 120 may be integrated within the circuitry of the computing device 106 (as shown) and/or within circuitry of an accessory or host device capable of transmitting measurements of the environmental sensors 120 to the computing device 106 and/or to a host device, such as when the computing device 106 is itself a plug-in accessory that transmits touch interaction information to a separate host device.

The environmental sensors 120 may employ a variety of different techniques to gather information about proximity and/or locations of object(s) relative to the reflective display 102, such as techniques that rely on sensed changes in localized capacitance, pressure detection, orientation (e.g., tilt information transmitted from a stylus) and/or optical imaging (e.g., to image objects close to the reflective display 102). In one implementation, the environmental sensors 120 include a grid-based capacitive sensor below the reflective display 102; in another implementation, the environmental sensors 120 include a pressure sensor and/or a tilt sensor within an active stylus designed to interact with the reflective display 102. In at least one implementation, the environmental sensors 120 include an ambient light sensor and the light-emitting display driver 126 is operable to adjust a pixel illumination setting (e.g., brightness or color) responsive to detection of the current ambient light level in a room. For example, the light-emitting display driver 126 may adjust pixel brightness to a lower brightness level when ambient light is low and to a higher brightness level when ambient light is high. In one implementation, the light-emitting display driver 126 utilizes inputs from the ambient light sensor to fix the display contrast such that the luminance of information displayed on the reflective display 102 matches illuminance incident on the external surface.

The light-emitting display driver 126 and the position detection engine 124 may each include hardware and/or software that is integrated within the computing device 106, integrated within a separate computing device (not shown), and/or distributed between multiple computing devices. In one implementation, the light-emitting display driver 126 and position detection engine 124 are stored in full or in part within memory of a host device separate from the computing device 106. If, for example, the computing device 106 is a tablet accessory designed for removable attachment to a host device, the light-emitting display driver 126 and position detection engine 124 may be located within memory of the host device and configured to communicate with hardware and/or software of the computing device 106. The light-emitting display driver 126 and the position detection engine 124 may be configured to communicate with one or more other additional applications (not shown), such as a note-creation application that saves information presented on the reflective display 102, either automatically or responsive to a defined type of user input.

Figure 2:
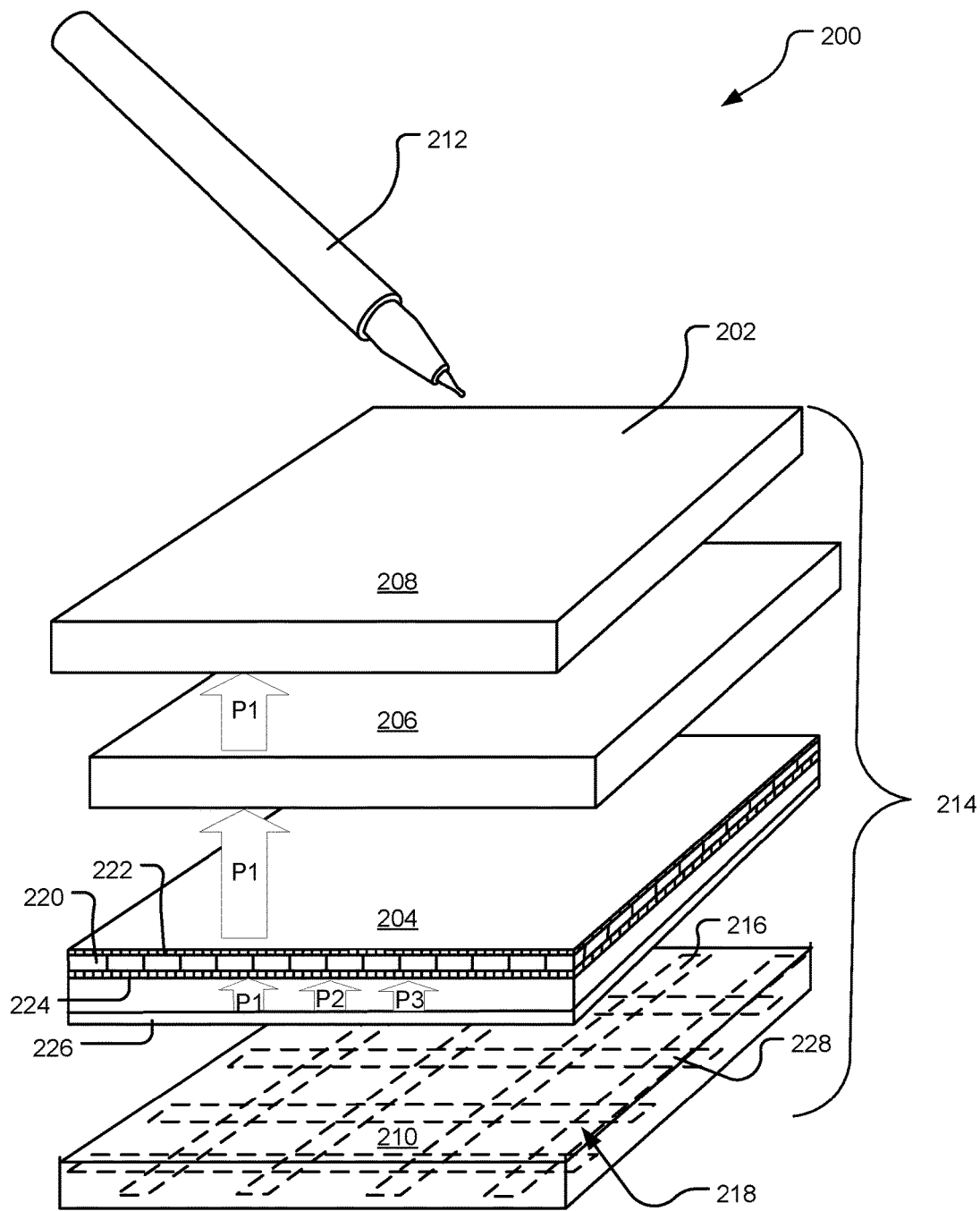
FIG. 2 illustrates another example electronic device including a reflective interactive surface that presents information responsive to detected touch input, such as touch interaction of a stylus or a user's finger.

FIG. 2 illustrates an expanding view of an example electronic device 200 including a reflective interactive surface 202 that presents information responsive to detected touch input, such as touch interaction of a stylus 212 or a user's finger (not shown). The reflective interactive surface 202 includes a multi-layer structure 214 further including at least a light-emitting display 204, a dielectric polarizing layer 206, a diffuser layer 208, and a touch-sense layer 210. Different implementations of the reflective interactive surface 202 may include one or more layers in addition to or in lieu of those illustrated in FIG. 2.

The light-emitting display 204 may be, for example, an LCD, LED, or OLED display or other type of display including an array of pixels that can be selectively and independently illuminated to emit light in the visible range. In FIG. 2, the light-emitting display 204 includes a display panel 220, polarizers 222 and 224, and a backpanel 226. The backpanel 226 provides light to the display panel 220 that is of a variety of polarization states (e.g., P1, P2, P3). Due to inclusion of the polarizers 222 and 224, light exiting the display panel 220 is of a select one of the polarizations (P1) transmitted by the backpanel 226.

Light emitted by the light-emitting display 204 is, in turn, transmitted sequentially through the dielectric polarizing layer 206 and the diffuser layer 208. In one implementation, the dielectric polarizing layer 206 includes one or more layers that exhibit a high level of metallic reflection from above that are also transmissive of some light received from below.

To maximize brightness of light transmitted through the reflective interactive surface 202, the dielectric polarizing layer 206 is, in one implementation, oriented such that a polarization state (P1) of the dielectric polarizing layer 206 matches a polarization state of light output (P1) from the light-emitting display 204. As a result, there is no absorption loss for light transmitted through the dielectric polarizing layer 206 from the light-emitting display 204.

The dielectric polarizing layer 206 is highly reflective and may, for example, exhibit a reflectivity on the order of 55-60% or more. Example dielectric polarizing films suitable for use within the dielectric polarizing layer 206 include, for example, wire grid polarizers and anisotropic materials that become strongly bifringement when stretched, such as dual brightness enhancer film (DBEF) and advanced polarizer film (APF). Thickness of the dielectric polarizing layer 206 may vary in different implementations depending on specific design characteristics. For example, DBEF may be a freestanding layer with a thickness on the order of 120 microns, while APF, in contrast, may be thinner (e.g., 40 microns) and formed as a laminate on the light-emitting display 110.

The diffuser layer 208 includes an optically diffuse material that scatters light reflected off the dielectric polarizing layer 206 to create a desired visual effect, such as to cause the reflective interactive surface 202 to appear metallic. A variety of materials may be suitable to create such effect, including without limitation etched glass, sol-gel coated glass, or polymer. Diffuser materials may be designed with external surfaces structured to scatter light (e.g., surface type diffusers) or designed to include particulates that cause light scattering (e.g., volume type diffusers). In one implementation, the diffuser layer 208 is a 40 degree full-width half-max (FWHM) Gaussian diffuser. In different implementations, the diffuser layer 208 may include different types of materials and/or exhibit different diffusing properties that tune color and tone of the reflective interactive surface 202 in accord with specific design criteria. In at least one implementation, the diffuser layer 208 is selected to ensure that the reflective interactive surface 202 appears uniform in color or tone as compared to adjacent external device components, such as metallic components. The diffuser layer 208 may be adhered to the dielectric polarizing layer using any of a number of widely available adhesives including, for example Adhesives Research silicone adhesive or other commonly used adhesive.

The touch-sense layer 210 includes an electrical grid 218 including column conductive strips 216 and row conductive strips 228. In one implementation, the electrical grid 218 is a digitizer sensor operative to detect an electromagnetic signal emitted by the stylus 212. In another implementation, the electrical grid 218 additionally or alternatively functions as a grid-based capacitive sensor operative to detect a change in localized capacitance caused by a human finger, hand, or other objects in close proximity to the reflective interactive surface 202. In still another implementation, the touch-sense layer 210 includes a digitizer sensor formed with a matrix of electrode junctions that are not constructed based on rows and columns of conductive strips. In yet another implementation, the touch-sense layer 210 includes a plurality of pressure sensors to detect pressure applied to the reflective interactive surface 202 by the stylus 212 or other object.

Notably, the position of the electrical grid 218 may differ from that shown in implementations where the electrical grid 218 functions as a grid-based capacitive sensor rather than a digitizer sensor. In one such implementation, the electrical grid 218 is positioned in front of the light-emitting display 204 (e.g., between the light emitting display 204 and the dielectric polarizing layer 206).

The touch-sense layer 210 is coupled to circuitry (not shown) that manages and controls touch detection (e.g., stylus-based detection and/or finger based detection) and selectively illuminates pixels of the light-emitting display 204 responsive to detected touch and/or movements of an object along the reflective interactive surface 202. The circuitry may, for example, include a driver for controlling the light-emitting display 204 and/or a position detection engine for detecting and analyzing input from the touch-sense layer 210.

In one implementation, a position detection engine samples and processes output from both the row conductive strips 228 and the column conductive strips 216 to determine coordinates of an object relative to the electrical grid 218. In implementations where the stylus 212 is an active stylus (e.g., including electrical components for signal transmission), the stylus 212 may itself include one or more environmental sensors such as a pressure sensor or a tilt sensor that provide information usable to determine a position of a writing tip of the stylus 212 relative to the electrical grid 218. Further, the active stylus may include an integrated circuit including one or more application-specific integrated circuits ("ASICs"), one or more system on chips ("SOCs"), one or more programmable intelligent computers ("PICs") for processing sensor measurements and/or transmitting sensor measurements to a host device.

Responsive to touch detection and the determination of one or more object positions relative to the light-emitting display 204, the electronic device 200 selectively illuminates one or more pixels of the light-emitting display 204 corresponding to the determined object positions. If, for example, the object is detected at a range of different positions as it is dragged along a path of the reflective interactive surface 202, pixels are sequentially illuminated responsive to each individual measurement by the electrical grid 218 so as to illuminate the full path traversed by the object. In at least one implementation, the electronic device 200 further includes an application (not shown) that allows a user to select color and/or brightness settings for the light-emitting display 204. Additionally, the electronic device 200 may further include one or more applications for saving information presented on the reflective interactive surface 202, such as by saving such information automatically or responsive to a predefined form of user input, such as a detectable gesture or other touch input, keystroke input, or voice input. For example, the user may tap or swipe a finger along the interactive reflective surface 202 to save information currently presented and/or clear the interactive reflective surface 202 entirely.

Figure 3:
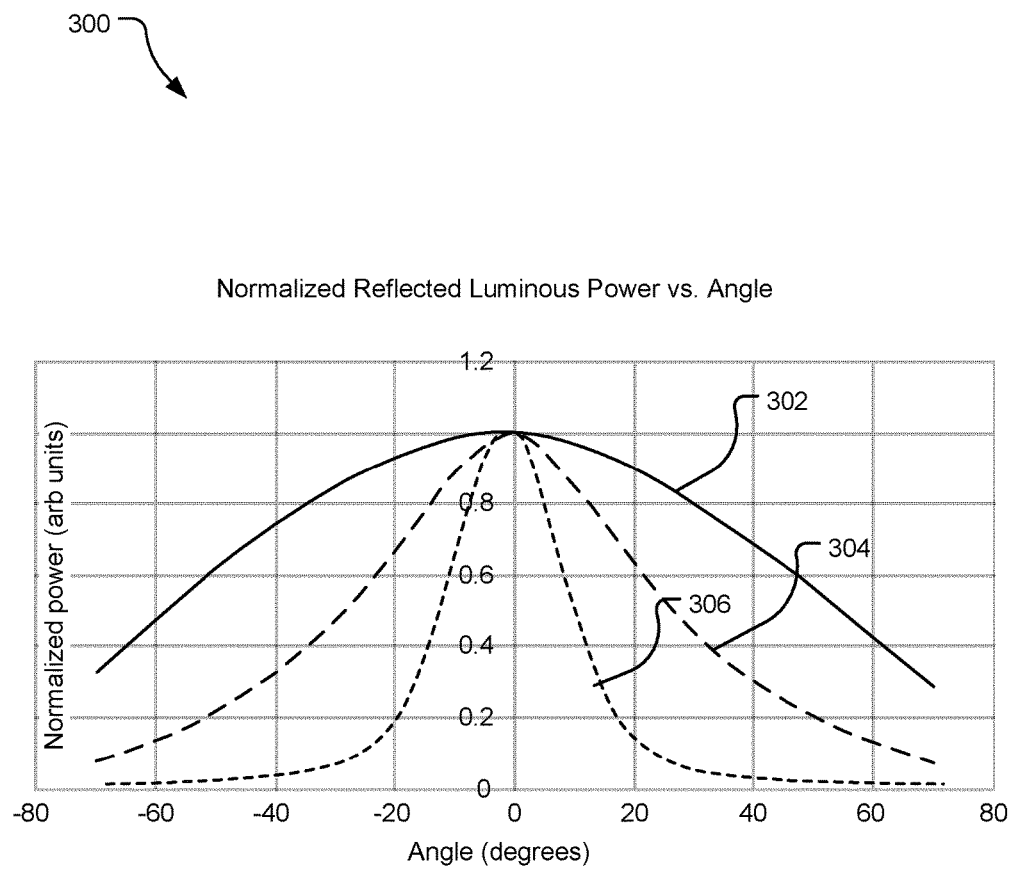
FIG. 3 illustrates a plot including example reflected luminance curves for each of a number of materials.

FIG. 3 illustrates a plot 300 including example reflected luminance curves for various materials illustrating how light is reflected when directed onto a surface of the material from an incident angle normal to the surface. On the y-axis, luminance is represented in arbitrary units (arb) and the x-axis indicates various reflection angles (degrees) away from normal incidence. A first line 302 illustrates optical power of light reflected off a piece of white paper. As shown, white paper reflects incident light at a wide array of angles of incidence. A second line 304 illustrates optical power of light reflected for silver paint. Silver paint is highly reflective at near-normal angles of incidence but is increasingly less reflective than white paper for incident angles increasing in magnitude away from normal (e.g., 0 degrees). This effect is also true for a variety of other metallic-looking surfaces that include metallic paint or bead-blasted materials. In general, metallic-looking materials cause reflected light to diffuse over a smaller range of angles than materials that are not metallic in appearance. One challenge in creating a reflective display as described herein with respect to FIGS. 1-2 stems from the selection and tuning of materials and structures to form a stack that is transmissive of light from a first direction (e.g., below) that is also sufficiently reflective of light from an opposite direction (e.g., from above) to create the illusion of a "metallic" surface. Stated differently, the challenge lies in creating a stack of layers that is transmissive of light emitted from below but that has a corresponding diffusion curve that "mimics" the reflective diffusion curve for a metal, such as silver paint (as exhibited by the second line 304).

A third line 306 shown in FIG. 3 illustrates an example optical power of light reflected off one example reflective display including characteristics consistent with those described herein. Data represented by the third line 306 was obtained by directing light on a diffuser layer overlying a dielectric polarizer layer. In the implementation providing this dataset, the diffuser layer is an Excellis 12 degree diffuser and the dielectric polarizer layer is an advanced polarizer film (specifically, 3M APF v4). The two materials are bonded using an Adhesives Research silicone adhesive. As shown by the third line 306, the reflective display exhibits reflective properties similar to silver paint, indicating strong similarities in physical appearance.

Figure 4:
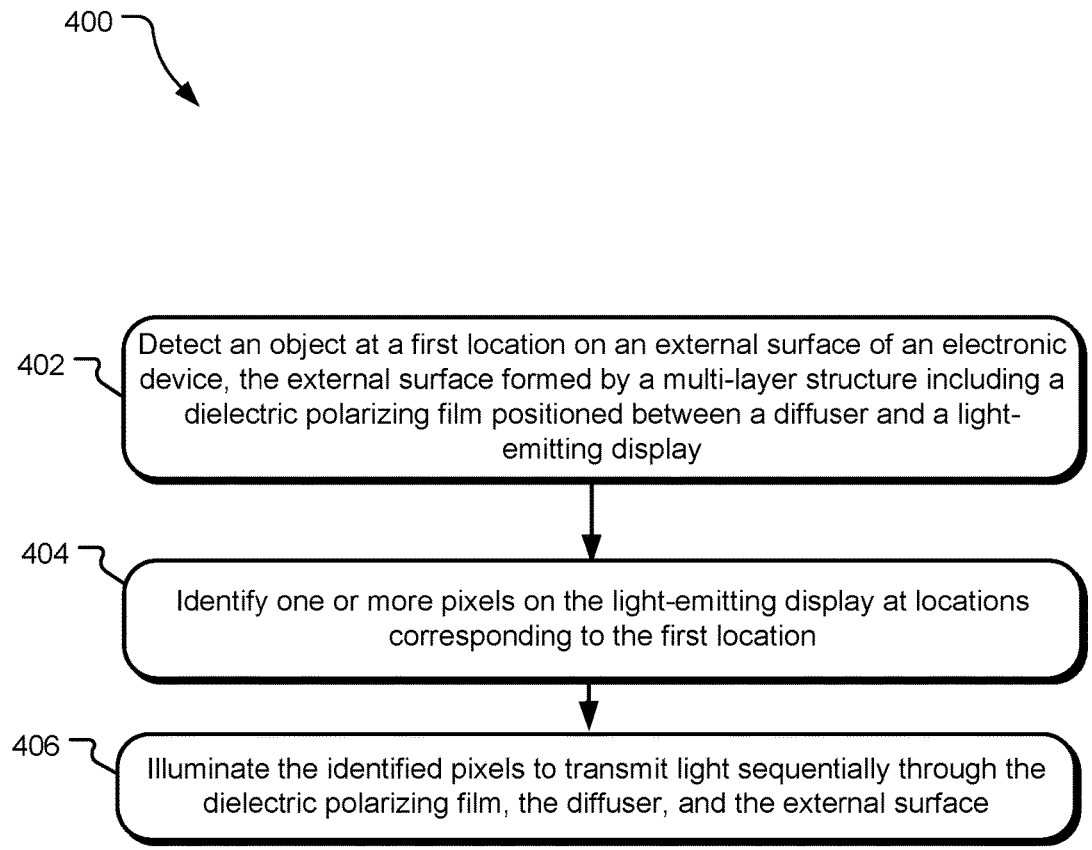
FIG. 4 illustrates example operations for presenting information on a reflective interactive external surface of an electronic device.

FIG. 4 illustrates example operations for presenting information on a reflective (e.g., metallic) interactive external surface of an electronic device. According to one implementation, the reflective external surface is formed by a multi-layer structure including a dielectric polarizing film positioned between a diffuser and a light-emitting display.

A detection operation 402 detects an object at a first location on an external surface of an electronic device. Detecting the object may, for example, include receiving and analyzing input from a plurality of environmental sensors such as a capacitive grid, sensors of a device accessory (e.g., a stylus), or input from imaging sensors. Responsive to the detection operation 402, an identification operation 404 identifies one or more pixels on the light-emitting display at locations corresponding to the first location where the object was detected. An illumination operation 406 illuminates the identified pixels, thereby transmitting light sequentially through the dielectric polarizing film, the diffuser, and through the external surface.

Figure 5:
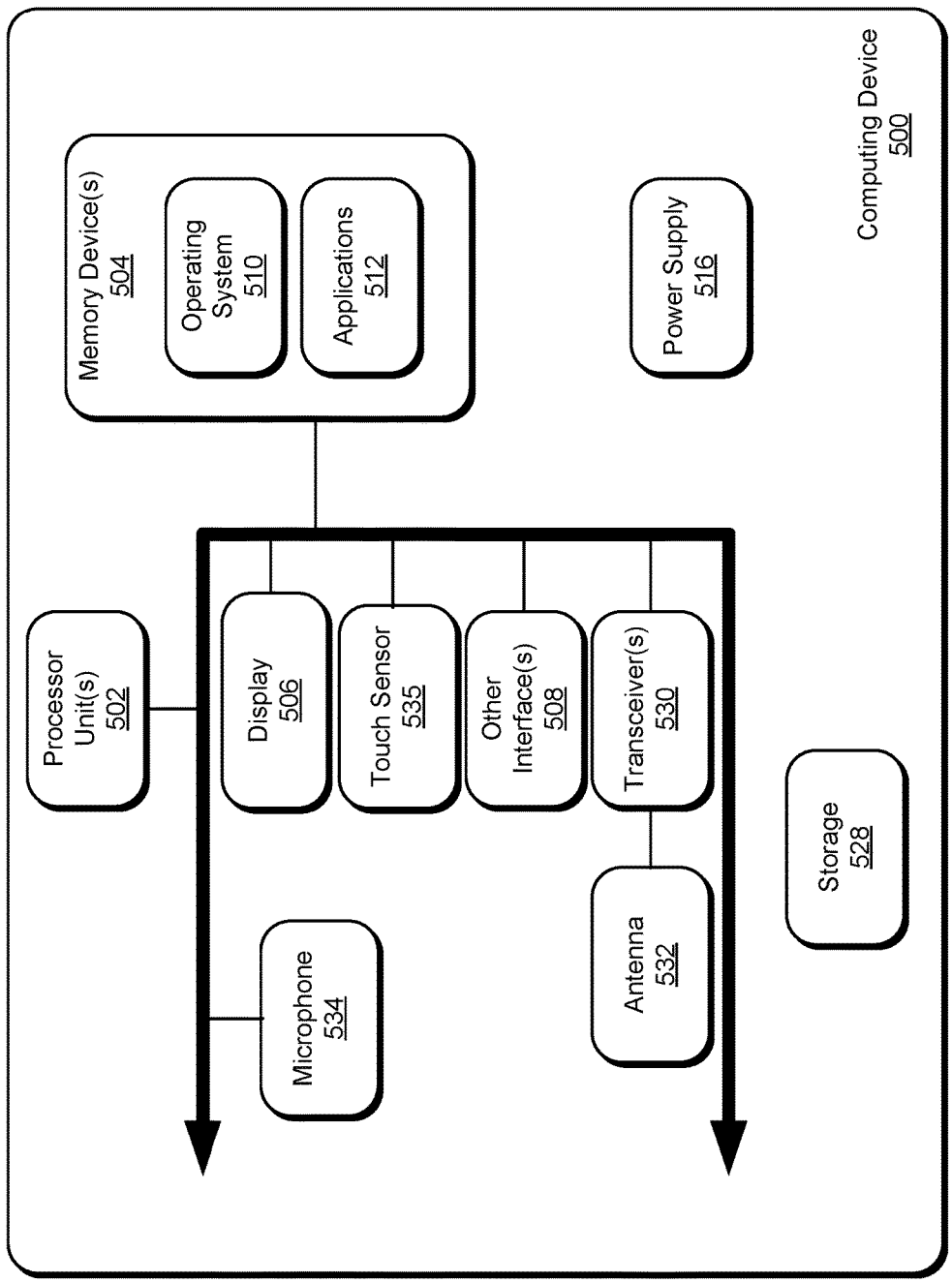
FIG. 5 illustrates an example schematic of a processing device suitable for inclusion of a highly-reflective display or a reflective interactive writing surface.

FIG. 5 illustrates an example schematic of a processing device 500 suitable for inclusion of a highly-reflective (e.g., metallic) display or a reflective interactive writing surface. The example processing device 500 includes one or more processing unit(s) 502, one or more memory device(s) 504, a display 506, and other interfaces 508 (e.g., buttons). The memory device(s) 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory device(s) 504 and is executed by the processing unit(s) 502, although it should be understood that other operating systems may be employed.

One or more applications 512, such as a position detection engine and light-emitting display driver are loaded in the memory device(s) 504 and executed on the operating system 510 by the processing unit(s) 502. The applications 512 may receive input from the display 506 and/or a touch sensor 535 embedded within or beneath the display 506. The example processing device 500 includes a power supply 516, which is powered by one or more batteries or other power sources and which provides power to other components of the processing device 500. The power supply 516 may also be connected to an external power source that overrides or recharges the built-in batteries or other power sources.

The processing device 500 includes one or more communication transceivers 530 and an antenna 532 to provide network connectivity (e.g., a mobile phone network, Wi-Fi®, BlueTooth®, etc.). The processing device 500 may also include various other components, such as a positioning system (e.g., a global positioning satellite transceiver), one or more accelerometers, one or more cameras, an audio interface (e.g., a microphone 534, an audio amplifier and speaker and/or audio jack), and storage devices 528. Other configurations may also be employed.

In an example implementation, a mobile operating system, various applications (including a position detection engine) and other modules and services may be embodied by instructions stored in memory device(s) 504 and/or storage devices 528 and processed by the processing unit(s) 502. The memory device(s) 504 may be memory of host device or of an accessory that couples to a host. Some or all aspects of the position detection engine and light-emitting display driver described with respect to FIG. 1-2, above, may be saved in memory of one or more of a host device, display accessory (e.g., touchscreen accessory including a digitizer sensor), or a handheld writing accessory (e.g., the active stylus). Likewise, some or all aspects of the position detection engine and light-emitting display driver may be executable by any one or more of a host device, display accessory, or a handheld writing accessory (e.g., the active stylus interacting with the display accessory).

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example electronic device discloses herein includes a reflective multi-layer structure forming an external surface of the electronic device and including a light-emitting display separated from the external surface by a dielectric polarizing film and a diffuser. The light-emitting display is positioned to present information on the external surface by transmitting light sequentially through the dielectric polarizing film and the diffuser.

In another example electronic device of any preceding electronic device, the electronic device further comprises a position detection engine and a light-emitting display driver. The position detection engine is configured to detect an object at a first location on the external surface relative to the light-emitting display, and the light-emitting display driver is configured to illuminate at least one pixel of the light-emitting display at a pixel location corresponding to the first location responsive to the detection of the object at the first location.

In another example electronic device of any preceding electronic device, the electronic device further includes an ambient light sensor, and the light-emitting display driver is further configured to adjust brightness of the at least one illuminated pixel based on a measurement of the ambient light sensor.

Still another example electronic device of any preceding electronic device further includes an electrode grid spanning an area of the light-emitting display. The electrode grid is configured to detect changes in capacitance at a plurality of grid locations aligned with pixel locations of the light-emitting display.

In yet another example electronic device of any preceding electronic device, the light-emitting display driver is further configured to sequentially illuminates a series of pixels of the light-emitting display responsive to detection of an object at a series of corresponding grid locations.

In another example electronic device of any preceding electronic device, the reflective multi-layer structure appears metallic at the external surface.

In another example electronic device of any preceding electronic device, the dielectric polarizing film includes a material selected from a group comprising: dual brightness enhancement film (DBEF), advanced polarizer film (APF), and wire grid polarizer.

In still another example electronic device of any preceding electronic device the diffuser includes a material selected from a group comprising: etched glass, sol-gel coated glass, and polymer.

In yet another example electronic device of any preceding electronic device, the dielectric polarizing film has an output polarization direction aligned with an output polarization direction of the light-emitting display.

An example method disclosed herein includes transmitting light from a light-emitting display and sequentially through a dielectric polarizing film and a diffuser to present information on an external surface of an electronic device. The light-emitting display is separated from the external surface by the dielectric polarizing film and the diffuser.

Another example method of any preceding method further includes detecting an object at a first location on the external surface relative to the light-emitting display and illuminating at least one pixel of the light-emitting display at a pixel location corresponding to the first location responsive to the detection of the object at the first location.

Another example method of any preceding method further includes detecting ambient light from an environment external to the electronic device and adjusting brightness of the at least one illuminated pixel based on the detected ambient light.

In still another example method of any preceding method, the external surface appears metallic in a region where the information is presented.

In still another example method of any preceding method, the dielectric polarizing film includes a material selected from a group comprising: dual brightness enhancement film (DBEF), advanced polarizer film (APF), and wire grid polarizer.

In yet another example method of any preceding method, the diffuser includes a material selected from a group comprising: etched glass, sol-gel coated glass, and polymer.

In another example method of any preceding method, the dielectric polarizing film has an output polarization direction aligned with an output polarization direction of the light-emitting display.

Yet another example method of any preceding method further includes detecting the object at the first location further includes detecting a change in capacitance proximal to the first location.

An example electronic device disclosed herein includes a means for transmitting light from a light-emitting display and sequentially through a dielectric polarizing film and a diffuser to present information on an external surface of an electronic device, where the light-emitting display is separated from the external surface by the dielectric polarizing film and the diffuser.

An example interactive writing surface disclosed herein includes a reflective multi-layer structure forming an external surface of an electronic device and including a light-emitting display separated from the external surface by a dielectric polarizing film and a diffuser. In addition, the interactive writing surface further includes a position detection engine configured to detect an object at a first location on the external surface relative to the light-emitting display, and a light-emitting display driver configured to illuminate at least one pixel of the light-emitting display and transmit light sequentially through the dielectric polarizing film and the diffuser to present information on the external surface responsive to the detection of the object at the first location.

In an example interactive writing surface of any preceding interactive writing surface, the external surface formed by the reflective multi-layer structure appears metallic.

In still another example interactive writing surface of any preceding interactive writing surface, the dielectric polarizing film has an output polarization direction aligned with an output polarization direction of the light-emitting display.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. An electronic device comprising:
a reflective multi-layer structure forming an external surface of the electronic device and including a light-emitting display with a polarizing layer, the light-emitting display being separated from the external surface by a dielectric polarizing film and a diffuser, the light-emitting display positioned to present information on the external surface by transmitting light sequentially through the dielectric polarizing film and the diffuser.

2. The electronic device of claim 1, further comprising:
a position detection engine stored in memory and configured to detect an object at a first location on the external surface relative to the light-emitting display; and
a light-emitting display driver configured to illuminate at least one pixel of the light-emitting display at a pixel location corresponding to the first location responsive to the detection of the object at the first location.

3. The electronic device of claim 2, further comprising:
an ambient light sensor, wherein the light-emitting display driver is further configured to adjust brightness of the at least one illuminated pixel based on a measurement of the ambient light sensor.

4. The electronic device of claim 2, further comprising an electrode grid spanning an area of the light-emitting display, the electrode grid configured to detect changes in capacitance at a plurality of grid locations aligned with pixel locations of the light-emitting display.

5. The electronic device of claim 4, wherein the light-emitting display driver is further configured to sequentially illuminate a series of pixels of the light-emitting display responsive to detection of an object at a series of corresponding grid locations.

6. The electronic device of claim 1, wherein the reflective multi-layer structure appears metallic at the external surface.

7. The electronic device of claim 1, wherein the dielectric polarizing film includes a material selected from a group comprising: dual brightness enhancement film (DBEF), advanced polarizer film (APF), and wire grid polarizer.

8. The electronic device of claim 1, wherein the diffuser includes a material selected from a group comprising: etched glass, sol-gel coated glass, and polymer.

9. The electronic device of claim 1, wherein the dielectric polarizing film has an output polarization direction aligned with an output polarization direction of the light-emitting display.

10. A method comprising:
transmitting light from a light-emitting display and sequentially through a dielectric polarizing film and a diffuser to present information on an external surface of an electronic device, the light-emitting display including a polarizing layer and being separated from the external surface by the dielectric polarizing film and the diffuser.

11. The method of claim 10, further comprising:
detecting an object at a first location on the external surface relative to the light-emitting display; and
illuminating at least one pixel of the light-emitting display at a pixel location corresponding to the first location responsive to the detection of the object at the first location.

12. The method of claim 11, further comprising:
detecting ambient light from an environment external to the electronic device; and
adjusting brightness of the at least one illuminated pixel based on the detected ambient light.

13. The method of claim 10, wherein the external surface appears metallic in a region where the information is presented.

14. The method of claim 10, wherein the dielectric polarizing film includes a material selected from a group comprising: dual brightness enhancement film (DBEF), advanced polarizer film (APF), and wire grid polarizer.

15. The method of claim 10, wherein the diffuser includes a material selected from a group comprising: etched glass, sol-gel coated glass, and polymer.

16. The method of claim 10, wherein the dielectric polarizing film has an output polarization direction aligned with an output polarization direction of the light-emitting display.

17. The method of claim 11, wherein detecting the object at the first location further includes detecting a change in capacitance proximal to the first location.

18. An interactive writing surface comprising:
a reflective multi-layer structure forming an external surface of an electronic device and including a light-emitting display with a polarizing layer, the light-emitting display being separated from the external surface by a dielectric polarizing film and a diffuser;
a position detection engine stored in memory and configured to detect an object at a first location on the external surface relative to the light-emitting display; and
a light-emitting display driver configured to illuminate at least one pixel of the light-emitting display and transmit light sequentially through the dielectric polarizing film and the diffuser to present information on the external surface responsive to the detection of the object at the first location.

19. The interactive writing surface of claim 18, wherein the external surface formed by the reflective multi-layer structure appears metallic.

20. The interactive writing surface of claim 18, wherein the dielectric polarizing film has an output polarization direction aligned with an output polarization direction of the light-emitting display.

21. The electronic device of claim 1, wherein the light-emitting display includes a liquid crystal panel and two polarizing layers.

* * * * *